United States Patent Office 3,677,786
Patented July 18, 1972

3,677,786

LINE DRAWING AND MARKING SYSTEM

Walter G. Hollmann, Lake Forest, and Frederick M. Lozo III, Niles, Ill., assignors to Teledyne, Inc., Los Angeles, Calif.

No Drawing. Filed Oct. 10, 1969, Ser. No. 865,502
Int. Cl. B44f *1/10;* G03c *11/22*
U.S. Cl. 117—1.7 20 Claims

ABSTRACT OF THE DISCLOSURE

Line drawing and marking system characterized by high speed operation which adapts it to computer-controlled recording and plotting. Lines or other markings are formed on a surface or substrate bearing a color-forming iodine reactive substance and an agent for releasing free iodine from alkali metal iodide or ammonium iodide solution by applying such a solution to each area of the surface where a line or other mark is desired. The surface on which the lines or other markings are formed may be any, suitable web such as paper or film and the alkali metal iodide solution may be applied manually or by an electronically controlled pen.

This invention relates, generally, to innovations and improvements in systems and materials for drawing lines or making other markings on various surfaces, such as potentiometric and amperometric recording materials wherein the lines or markings are formed by reaction between reactive components at the surface to be marked or to have the lines drawn thereon and a solution supplied by a marking pen or other suitable device.

More specifically, the invention relates to such systems and materials, wherein the surface or substrate on which lines or other markings are to be formed bears a color-forming iodine-reactive substance and an agent for releasing free iodine from an alkali metal iodide or ammonium iodide solution, and wherein a pen is supplied with such an iodide solution.

It has been found that preferred results from the standpoint of the quality and light resistance of the lines or markings are obtained when the color-forming iodine-reactive substance is either a starch material having an amylose content (i.e. of pure amylose based on the total starch solids) at least about 40% by weight or a higher molecular weight polymer containing the vinyl alcohol group as the primary polymerizing group. When a vinyl alcohol group polymer is utilized, the presence of the borate anion is required for formation of a colored complex with iodine.

While the invention has general and wide application to a variety of marking and drawing operations including manual drafting, it has special application to high speed, electronically controlled drafting, plotting and recording in which the lines or other markings are formed as a result of electronically controlled relative interengaging movements between a pen or marker supplied with an alkali metal or ammonium iodide solution and the surface drawn or marked on.

In recent years, various automated marking, plotting, charting and drafting systems and equipment have come into increasing use. Typically such equipment operates at high speed and comprises means for rapidly moving potentiometric or amperometric recording material in the form or charts or sheets, while independently moving thereon a pen or marker of some type. The relative movements of the pen with respect to the sheet or chart may be referred to as electronically controlled and are characterized by the high speeds at which the lines or markings can be drawn or formed. However, in many such systems and operations, the lines or markings could be drawn or formed at much faster speeds and/or with better quality and results if there were a practical and improved way of forming the lines or markings with uniform weight and intensity without appreciable breaks or discontinuities therein.

Since the charts or drawings produced by computer-controlled operations are often reproduced and in turn used to control various automated equipment, the lines or markings should be formed accurately and uniformly and often must be fine and have excellent detail.

Substantial efforts have been devoted to developing a pen in which inks of the various types may be used for drawing lines in electronically controlled equipment of the type referred to. However, when lines have been drawn at high speeds, e.g. from 15 to 20 inches per second, the lines or markings tend to have discontinuities or breaks in them and often are not of good quality in respect to weight and intensity. Since substantial difficulties have been encountered in attempting to use pens of markers or different types which are supplied with ink or marking fluids, various expedients have been attempted, such as replacing an inking pen with an electric type stylus, a pin point light beam, etc.

The object of the present invention, generally stated, is the provision of practical and improved materials whereby lines or markings may be drawn or formed, if desired at high speeds by modern computerized high-speed plotters, recorders, drawing equipment, etc., with the lines or markings being characterized by their high quality in respect to uniform weight, intensity, opacity, light fastness or stability, reproducibility by various techniques, and freedom from breaks and discontinuities.

A further object and more specific object of the invention is the provision of potentiometric and amperometric recording materials which have improved recording and plotting speeds over recording materials presently known or available and which are particularly useful in systems of the class described. More specifically, an object of the present invention is the provision of the potentiometric and amperometric recording materials of the class described, wherein the surfaces thereof bear a color-forming iodine-reactive substance together with an agent for releasing free iodine from an alkali metal or ammonium iodide solution whereby such a solution is applied by a pen or other marker and a line is drawn or mark formed that has the desirable quality characteristics referred to.

A still further object of the invention is to provide a means for producing readily visible lines or markings by use of a colorless or substantially colorless writing fluid.

Certain other objects of the invention will in part be obvious and will in part appear hereinafter.

For a more complete understanding of the nature and scope of the invention, reference may now be had to the following detailed description thereof, wherein illustrative working examples are set forth and permissible changes and variations therein are set forth.

The surfaces or substrates on which lines are drawn and markings made in accordance with the present invention will generally be provided by sheets or webs of paper or plastic film. However, the surfaces may be provided by a variety of other materials including metal, glass, plastic, wood, ceramics, cloth, etc. Whatever the surface employed may be it will bear or have available thereon or thereat a color-forming iodine-reactive substance in uniform and intimate admixture with an agent for releasing free iodine from an alkali metal or ammonium iodide solution. Generally, the admixture will extend over all, or large areas of a surface such as completely covering one or both surfaces of a sheet of paper or film. However, if desired, the treated surface may be limited to particular areas of any desired extent or shape.

In practicing the present invention the pen or other marker means is generally supplied with an aqueous alkali metal or ammonium iodide solution such as one containing 9% potassium iodide and 0.7% potassium iodate. Potassium iodide may be replaced with lithium iodide or ammonium iodide if desired. The strength or concentration of the potassium iodide solution is not highly critical. For example, the potassium iodide content may range from 1% to 15% and inclusion of the iodate is optional. While water will usually be employed as the sole solvent additives may be incorporated such as, humectants to prevent excessive drying or to control the drying rate, viscosity control agents, water miscible solvents, dyes for coloring purposes, wetting agents, etc.

The color-forming iodine-reactive substance on the surface to be drawn or marked on is preferably either (1) a starch material having pure amylose content of at least of about 40% by weight based on the total starch dry substance basis, or (2) a high molecular weight polymer containing the vinyl alcohol group as the primary polymerizing group. When such a high molecular weight polymer is used the presence of a borate anion is required for color forming reaction with free iodine.

It has been found in accordance with the present invention that in drawing lines or other markings by forming colored starch-iodine complexes the stability thereof to heat and light increases markedly as the amylose content increases over and above the normal weight ratio of amylose to amylopectin. Specifically, when the pure amylose content is at least about 40% by weight d.s.b. with the balance of the total starch content being amylopectin, the heat and light stability of the starch-iodine complexes formed in practicing the invention are adequate for most purposes. However, it is preferred that the pure amylose content be at least 50% by weight. Generally, the amylose content of natural starches does not exceed about 26% depending on the type of starch.

In recent years, high amylose starches have become commercially available wherein the amylose content exceeds 40% by weight. Some of the commercially high amylose starches are the result of the genetic developments while others are the result of starch fractionation processes. While substantially pure amylose is available it is relatively expensive and for purposes of the present invention it is not required.

The high amylose starches useful in practicing the present invention may not only be the unmodified starches but also the derivatized or modified high amylose starches including oxidized starches, starch ethers and starch esters.

Preferably the high amylose starch materials are used in their gelatinized (i.e. cooked) form.

The high molecular weight polymers containing the vinyl alcohol group as the primary polymerizing group used in practicing the invention are preferably commercially available polyvinyl alcohols of high molecular weight. Iodine forms heat and light stable colored complexes with such high molecular weight polymers when reacted in the presence of a borate anion. Related polymers such as of ethylene vinyl alcohol will also give color complexes with free iodine in the presence of a borate anion. Preferably sodium chloride is also present. Desirably the molecular weights of the polymers based on the vinyl alcohol group useful in practicing this invention range from 14,000 to 200,000.

The color complexes which form in practicing the present invention require the presence or availability of free iodine. Release or liberation of free iodine from a potassium iodide or other iodide solution utilized in a pen is achieved by incorporating an iodine releasing agent in the coating on the surface to be drawn or marked on. Such agents act as oxidizing agents in releasing free iodine from the iodide in solution. Various salts are useful for this iodine releasing purpose, notably copper sulfate. However, a variety of other oxidizing salts and substances may be utilized some of which will be referred to in the examples below.

The admixtures of high amylose content starch and the iodine release agent, or of polyvinyl alcohol polymer or related polymer (plus borate anion) and the iodine release agent, may be deposited on or applied to the surface to be drawn or marked on by a variety of known coating and printing operations. For example, the various coating techniques and equipment commercially available for coating traveling webs of paper or film may be readily employed, specifically including direct and reverse roll coaters, brush and spray coaters, size presses, etc.

The following specific examples may be used in practicing the invention. These examples may be modified or varied in different respects including those hereinafter specifically mentioned.

EXAMPLE NO. 1

| | | |
|---|---|---|
| Water | ml | 100 |
| $CuSO_4 \cdot 5H_2O$ | g | 3 |
| Gelvatol (1–90)[1] 10% solution | ml | 25 |
| Boric acid 4% solution | ml | 3.5 |

[1] Polyvinyl alcohol percent hydrolysis 100–99; high molecular weight (Shawinigan Resins Company).

The 10% Gelvatol solution may be made by adding the required amount of Gelvatol 1–90 to cold water and heating or steaming to 85–90 degrees C. while stirring. The Gelvatol solution, water, and copper sulfate may be blended together in any desired order but the boric acid solution should be added slowly to the other three ingredients with stirring to prevent gel formation.

The foregoing preparation was coated on paper by direct roll followed by air knife scraping and followed by drying of a temperature of about 95 degrees C. It was also similarly coated on biaxially oriented polyester film. A capillary pen filled with 10% aqueous potassium iodide solution, was used to draw lines on the coated paper and film at speeds up to 10 inches per second. Fine dark blue lines immediately formed that were stable to light and heat. They had good opacity, reproducibility, intensity and freedom from breaks and discontinuities.

EXAMPLE NO. 2

Same as Example No. 1 except that the 3 grams of $CuSO_4 \cdot H_2O$ were replaced with 2.5 grams of $$Fe(NO_3)_3 \cdot 9H_20$$

EXAMPLE NO. 3

Same as Example No. 1 except that the 3 grams of $CuSO_4 \cdot 5H_2O$ were replaced with 3 grams of $$2NH_4NO_3 \cdot Ce(NO_3) \cdot 4H_2O$$

EXAMPLE NO. 4

Same as Example No. 1 except that the 3 grams of $CuSO_4 \cdot 5H_2O$ were replaced with 3 grams of $$(NH_4)_2SO_4 \cdot Ce_2(SO_4)_3 \cdot 8H_2O$$

EXAMPLE NO. 5

Same as Example No. 1 except that a pen filled with 10% aqueous lithium iodide solution was used to draw lines.

EXAMPLE NO. 6

| | | |
|---|---|---|
| Water | ml | 100 |
| $CuSO_4 \cdot 5H_2O$ | g | 5 |
| Gelvatol [1] (1–60) 10% solution | ml | 35 |
| Boric acid 4% solution | ml | 4 |

[1] Polyvinyl alcohol percent hydrolysis 100–99; approximate molecular weight—86,000 (Shawinigan Resins Company).

In Examples Nos. 1–6 the proportions of the ingredients are not highly critical and may singly vary with the following ranges.

| | | |
|---|---|---|
| Water | ml | 100 |
| Oxidizing salt for releasing iodine | g | 0.25–10 |
| Polyvinyl alcohol 10% solution | g | 10–100 |
| Boric acid 4% solution | g | 1.0–5.0 |

It will be appreciated that the concentrations of the polyvinyl alcohol and boric acid may vary from 10% and 4% respectively, and that the amounts used can be varied accordingly to obtain the desired dry substance basis. The polyvinyl alcohol in Examples 1–6 may be replaced with related polymers such as ethylene-vinyl alcohol copolymers and partially saponified poly(vinyl acetate).

In the following examples the color-forming iodine complexing ingredient is a starch material having a pure amylose content of at least about 40% by weight based on the total starch content.

EXAMPLE NO. 7

| | | |
|---|---|---|
| Water | ml | 100 |
| $CuSO_4 \cdot 5H_2O$ | g | 5.2 |
| Nepol 4125 [1] 10% starch dispersion (cold water dispersed, then cooked at 90–95 degrees C. for two hours) | ml | 39 |
| Polyco 953 vinylacetate homopolymer emulsion | ml | 10.2 |
| Gelva S–55–H polyvinyl acetate homopolymer dispersion | ml | 10.2 |
| Ucar 360 vinylacrylic latex dispersion | ml | 5.1 |
| Mykon WA 25% wt./total wt. in $H_2O$ | ml | 0.4 |

[1] Nepol 4125 is a modified (cationic) 55% pure amylose content; corn starch (A. E. Staley Manufacturing Co.); Polyco 953 (Borden Chemical Co.); Gelva S–55–H (Monsanto Chemical Co.); Ucar 360 (Union Carbide Chemical Co.); Mykon WA (Sun Chemical Co.).

The foregoing ingredients may be combined in the order listed.

EXAMPLE NO. 8

| | | |
|---|---|---|
| Water | ml | 100 |
| $CuSO_4 \cdot 5H_2O$ | g | 5.2 |
| Alderman Pea Starch [1] dispersion 10% (cooked) | ml | 40 |
| Resyn 25–1025 polyvinyl acetate dispersion | ml | 25 |
| Sodium dioctyl sulfosuccinate | g | 0.01 |

[1] Alderman Pea is starch with pure amylose content over 60% by weight; Resyn 25–1025 (National Starch Co.).

EXAMPLE NO. 9

| | | |
|---|---|---|
| Water | ml | 100 |
| $CuSO_4 \cdot 5H_2O$ | g | 5.2 |
| Sugary mutant cornstarch [1] dispersion 10% (cooked) | ml | 35 |
| Resin S–98 polyvinyl acetate dispersion | ml | 12.5 |
| Saponin | g | 0.01 |

[1] Sugary mutant cornstarch has a pure amylose content over 60% by weight; Resin S–98 (Monsanto).

EXAMPLE NO. 10

| | | |
|---|---|---|
| Water | ml | 100 |
| $CuSO_4 \cdot 5H_2O$ | g | 5.2 |
| Steadfast Pea Starch [1] dispersion 10% (cooked) | ml | 40 |
| Resyn 25–2813 vinyl acrylic copolymer latex | ml | 8.5 |
| Sodium bis (tridecyl) sulfosuccinate | g | 0.001 |

[1] Steadfast Pea Starch has an amylose content of over 60% by weight; Resyn 25–2813 (National Starch Co.).

In Examples Nos. 7–10 it will be understood that the copper sulfate may be replaced with other oxidizing salts capable of releasing iodine from potassium iodide solution such as used in Examples Nos. 2 and 3. In these examples the polyvinyl acetate dispersion, vinyl acetate emulsion, and vinyl acrylic copolymer latex serve as binders.

The Mykon WA, sodium bis(tridecyl) sulfosuccinate and sodium dioctyl sulfosuccinate in Examples Nos. 7–10, respectively act as wetting agents in the formulations.

In Examples Nos. 7–10 the proportions of the ingredients are not highly critical within limits and may vary within the following ranges:

| | | |
|---|---|---|
| Water | ml | 100 |
| Oxidizing salt for releasing iodine | g | 0.25–10 |
| High amylose starch dispersion 10% | g | 2.0–50 |
| Wetting agent (dry basis) | g | 0.001–0.1 |

It will be appreciated that the concentration of the starch dispersions may vary from 10% in which event the amounts utilized in the formulations will be adjusted on a dry weight basis.

We claim:

1. The method of drawing lines or making other markings which comprises applying on a surface where a line or other marking is desired an alkali metal or ammonium iodide solution, said surface bearing a color-forming iodine-reactive substance and an agent for releasing iodine from an alkali metal or ammonium iodide solution, said color-forming iodine-reactive substance being selected from the group consisting of (a) a starch substance having a pure amylose content of at least about 40% by weight based on the total starch content and (b) in the presence of a borate ion a high molecular weight polymer containing the vinyl alcohol group as the primary polymerizing group.

2. The method of claim 1 wherein said agent for releasing free iodine is an oxidizing salt present in a concentration of from approximately 0.25 to 10 parts dry weight, said starch substance is present in a concentration of from approximately 0.2 to 5 parts dry weight, and said high molecular weight polymer is present in a concentration of from approximately 1 to 10 parts dry weight.

3. The method of claim 1 wherein said solution of alkali metal iodide is applied by a pen.

4. The method of claim 1 wherein lines are drawn by electronically-controlled relative interengaging movement between a pen filled with an alkali metal iodide solution and said surface.

5. The method of claim 1 wherein said starch is gelatinized.

6. The method of claim 1 wherein said high molecular weight polymer containing the vinyl alcohol group as the primary polymerizing groups is polyvinyl alcohol having a molecular weight of from about 14,000 to about 200,000.

7. The method of claim 1 wherein said agent for releasing free iodine is an oxidizing agent.

8. The method of claim 1 wherein said agent for releasing free iodine is copper sulfate.

9. The method of claim 1 wherein said surface is provided by a sheet of paper.

10. The method of claim 1 wherein said surface is provided by a sheet of plastic film.

11. The method of claim 1 wherein said surface is provided by a sheet of tracing cloth.

12. A sheet for having lines or other markings made on at least one surface thereof which bears in at least certain areas thereof a color-forming iodine-reactive substance selected from the group consisting of (a) a starch substance having a pure amylose content of at least about 40% by weight based on the total starch content and (b) in the presence of a borate ion a high molecular weight polymer containing the vinyl alcohol group as the primary polymerizing group, and an agent for releasing free iodine from an alkali metal or ammonium iodide salt solution.

13. The sheet of claim 12 wherein said alkali metal iodide is potassium iodide.

14. The sheet of claim 12 wherein said agent for releasing free iodine is an oxidizing salt present in a concentration of from approximately 0.25 to 10 parts dry weight, said starch substance is present in a concentration of from approximately 0.2 to 5 parts dry weight, and said high molecular weight polymer is present in a concentration of from approximately 1 to 10 parts dry weight.

15. The sheet of claim 14 wherein said starch is gelatinized.

16. The sheet of claim 14 wherein said high molecular weight polymer containing the vinyl alcohol group as the primary polymerizing groups is polyvinyl alocohol having a molecular weight of from about 14,000 to about 200,000.

17. The sheet of claim 12 wherein said agent for releasing free iodine is copper sulfate.

18. The article of claim 12 wherein said sheet is formed of paper.

19. The article of claim 12 wherein said sheet is formed of plastic film.

20. The article of claim 12 wherein said sheet is formed of tracing cloth.

References Cited

UNITED STATES PATENTS

| | | | |
|---|---|---|---|
| 1,642,774 | 9/1927 | Grange | 117—1.7 |
| 3,112,214 | 11/1963 | Roberts et al. | 117—156 X |
| 3,329,525 | 7/1967 | Powers | 117—156 X |

OTHER REFERENCES

Mondala, E. Oliveri: Chemical Abstracts, vol. 5, part 1, January-April 1911, pp. 1035–6.

WILLIAM D. MARTIN, Primary Examiner

M. R. LUSIGNAN, Assistant Examiner

U.S. Cl. X.R.

117—36.2, 138.8 B, 155 VA, 156, 164